(12) United States Patent
Kurtti et al.

(10) Patent No.: US 8,335,647 B2
(45) Date of Patent: Dec. 18, 2012

(54) NAVIGATION BASED ON POPULAR USER-DEFINED PATHS

(75) Inventors: Jeffrey Wayne Kurtti, Prosper, TX (US); Donald H. Relyea, Jr., Dallas, TX (US); Brian F. Roberts, Frisco, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 955 days.

(21) Appl. No.: 12/327,933

(22) Filed: Dec. 4, 2008

(65) Prior Publication Data

US 2010/0145608 A1    Jun. 10, 2010

(51) Int. Cl.
*G01C 21/34*    (2006.01)
(52) U.S. Cl. ........................................ 701/533
(58) Field of Classification Search .......... 701/201, 701/202, 209, 533
See application file for complete search history.

(56) References Cited

U.S. PATENT DOCUMENTS

| | | | | |
|---|---|---|---|---|
| 6,249,740 B1 * | 6/2001 | Ito et al. | ......................... | 701/420 |
| 6,615,133 B2 * | 9/2003 | Boies et al. | .................... | 701/209 |
| 8,015,144 B2 * | 9/2011 | Zheng et al. | ..................... | 706/52 |
| 2009/0216435 A1 * | 8/2009 | Zheng et al. | ................... | 701/209 |
| 2010/0106603 A1 * | 4/2010 | Dey et al. | .................... | 705/14.63 |
| 2011/0145290 A1 * | 6/2011 | Fujii et al. | ...................... | 707/780 |

OTHER PUBLICATIONS

Marwan Abboud et al. "Real Time GPS Navigation System", Department of Electrical and Computer Engineering, American University, 2004.*

Shahid Jabbar et al. "GPS-Based Navigation in Static and Dynamic Environments", Universitat Freiburg, Freiburg, Germany, Dec. 1, 2003.*

* cited by examiner

*Primary Examiner* — Naeem Haq

(57) ABSTRACT

A device receives, from one or more user devices, one or more user-defined paths associated with a starting point and a destination point, and receives, from the one or more user devices, information associated with the one or more user-defined paths. The device also aggregates the one or more user-defined paths and the associated information, and determines one or more popular paths based on the aggregation of the one or more user-defined paths and the associated information, where the one or more popular paths are capable of being utilized by the one or more user devices for selection of a path for navigation.

16 Claims, 15 Drawing Sheets

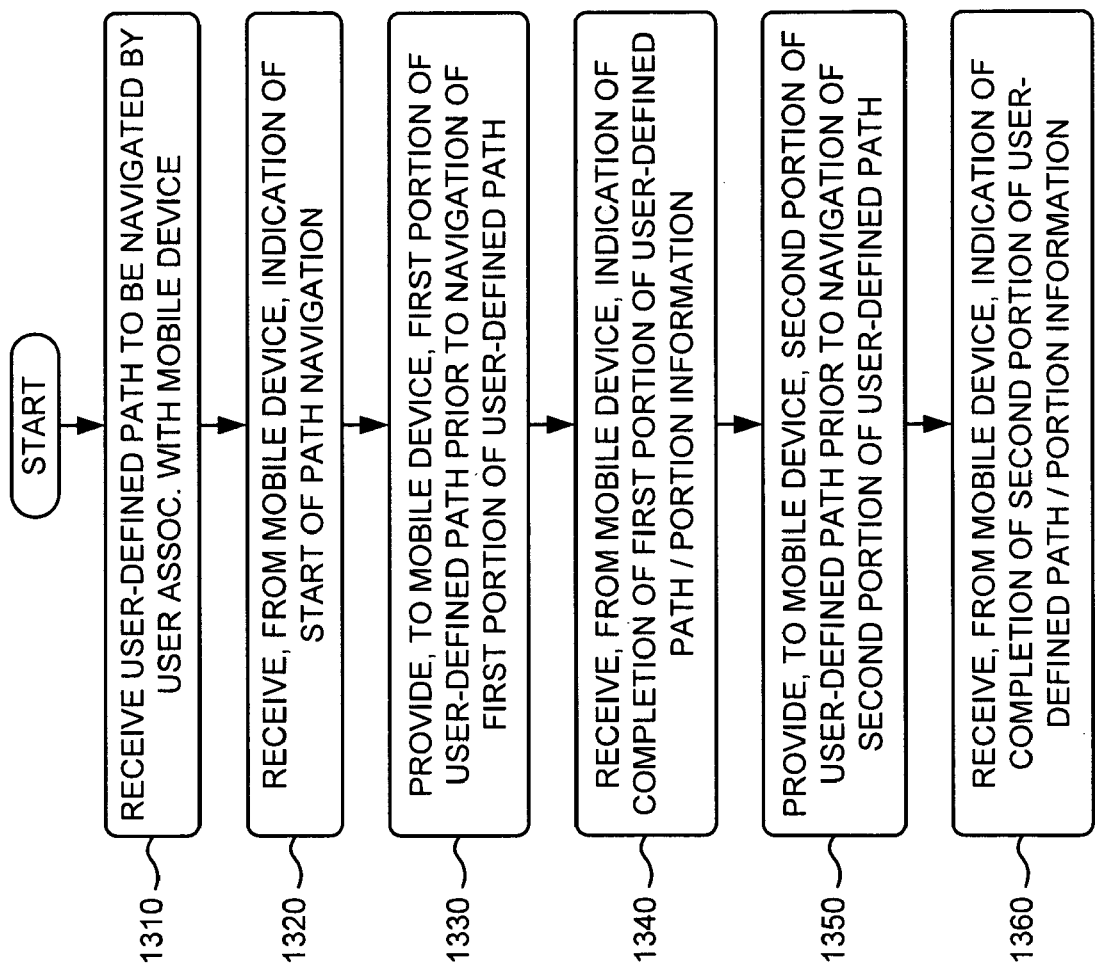

NAVIGATION BASED ON POPULAR USER-DEFINED PATHS

BACKGROUND

A mobile communication device (e.g., a cell phone, a personal digital assistant (PDA), a global positioning system (GPS) navigation device, etc) may display a map showing the location of a user of the mobile communication device in order to aid the user with navigation (e.g., when walking or driving around an unknown location). Many navigation applications enable the user of the mobile communication device to input information, such as a starting point, a destination point, how a path between the starting and destination points should be calculated (e.g., shortest distance, shortest time, most use of highways, etc.), etc. The navigation applications utilize this information to calculate a path for the user of the mobile communication device. However, such navigation applications do not enable the user to customize the calculated path.

BRIEF DESCRIPTION OF THE DRAWINGS

FIGS. 9-13 depict flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable a user associated with a mobile communication device (e.g., a cell phone, a PDA, etc.) to select one or more paths provided by a navigation application and preferred/chosen by other users of the navigation application. The user may define one or more paths (e.g., via the navigation application), and may share the defined paths with the other users (e.g., to provide social networking for navigation). In one implementation, for example, the systems and/or methods may receive one or more user-defined paths and associated information for starting and destination points, may aggregate the user-defined path(s) and the associated information, and may determine one or more most popular path(s) based on the aggregation. The systems and/or methods may receive user-defined starting and destination points for a particular path, and may provide corresponding most popular path(s) as recommendation(s) for the particular path. The systems and/or methods may receive selection of one of the corresponding most popular path(s) as a particular user-defined path, and may receive reported information associated with the particular user-defined path.

As used herein, the term "user" is intended to be broadly interpreted to include a user device or a user of a user device. A "path," as the term is used herein, is to be broadly interpreted to include a course between two points, a route between two points, etc. Furthermore, the term "user device," as used herein, is intended to be broadly interpreted to include a mobile user device or a stationary user device.

Figure 1:
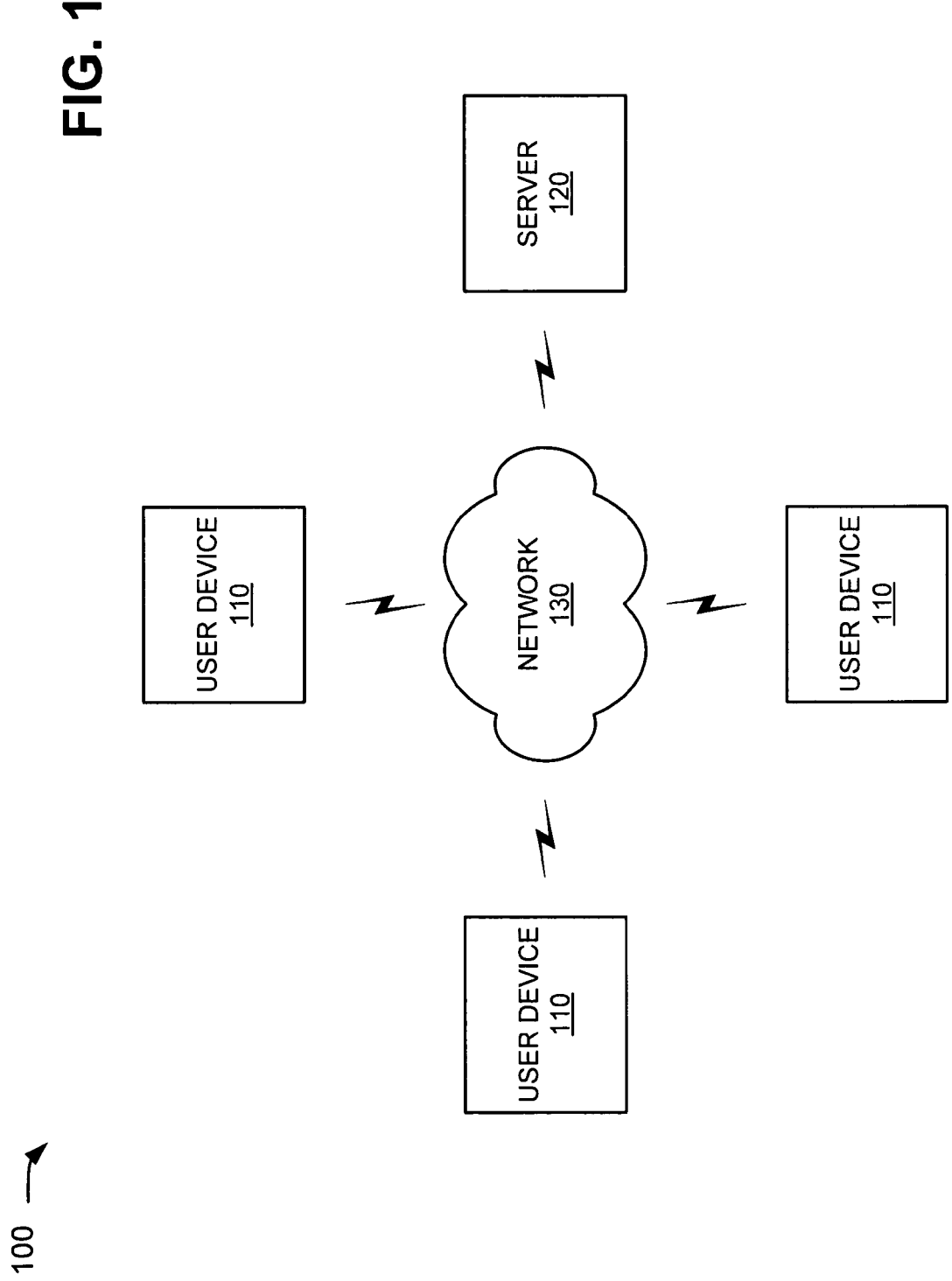
FIG. 1 depicts a diagram of an exemplary network in which systems and/or methods described herein may be implemented.

FIG. 1 is a diagram of an exemplary network 100 in which systems and/or methods described herein may be implemented. As illustrated, network 100 may include one or more user devices 110 and a server 120 interconnected by a network 130. Components of network 100 may interconnect via wired and/or wireless connections. Three user devices 110, a single server 120, and a single network 130 have been illustrated in FIG. 1 for simplicity. In practice, there may be more or less user devices 110, and/or more servers 120 and/or networks 130. Also, in some instances, one or more of the components of network 100 may perform one or more functions described as being performed by another one or more of the components of network 100.

Each of user devices 110 may include any device (e.g., a mobile communication device) that is capable of accessing server 120 via network 130. For example, each of user devices 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a GPS navigation device, an in-vehicle GPS navigation system, a personal computer, a set-top box (STB), a television, or other types of computation or communication devices, threads or processes running on these devices, and/or objects executable by these devices. In one implementation, user devices 110 may enable users to provide user-defined paths (e.g., used by a navigation application associated with user devices 110) and/or associated information (e.g., user mileage information, traffic information, duration information, user comments, pictures, etc.) to server 120 (e.g., so that server 120 may create user recommended paths based on the received information). In another implementation, user devices 110 may enable users to provide, to server 120, a user-defined start point and a user-defined destination point associated with a path (e.g., to be navigated by the users), to receive recommended paths from server 120, to select one of the recommended paths, and to report, to server 120, path information associated with the selected path (e.g., during or upon completion of the selected path).

Server 120 may include one or more server entities, or other types of computation or communication devices, that gather, process, search, and/or provide information in a manner described herein. In one implementation, server 120 may receive, from user devices 110, user-defined paths (e.g., used by a navigation application associated with user devices 110) and/or associated information (e.g., user mileage information, traffic information, duration information, user comments, pictures, etc.), may aggregate the user-defined paths and the associated information, and may determine most popular path(s) based on the aggregation. Server 120 may receive (e.g., from a particular user device 110) user-defined starting and destination points for a particular path, may provide (e.g., to the particular user device 110) corresponding most popular path(s) as recommendation(s) for the particular path, and may receive selection of one of the most popular path(s) as a particular user-defined path. Server 120 may receive (e.g., from the particular user device 110) reported information associated with the particular user-defined path (e.g., during or upon completion of the path).

In another implementation, server 120 may receive a user-defined path to be navigated by a user associated with a particular user device 110, and may receive, from the particular user device 110, an indication of a start of path navigation. Server 120 may provide, to the particular user device 110, a first portion of the user-defined path prior to navigation of the first portion, and may receive, from the particular user device 110, an indication of completion of the first portion of the user-defined path. Server 120 may provide, to the particular user device 110, a second portion of the user-defined path prior to navigation of the second portion, and may receive, from the particular user device 110, an indication of completion of the second portion of the user-defined path.

Network 130 may include a local area network (LAN), a wide area network (WAN), a metropolitan area network (MAN), a telephone network, such as the Public Switched Telephone Network (PSTN) or Public Land Mobile Network (PLMN), an intranet, the Internet, or a combination of networks.

Figure 2:
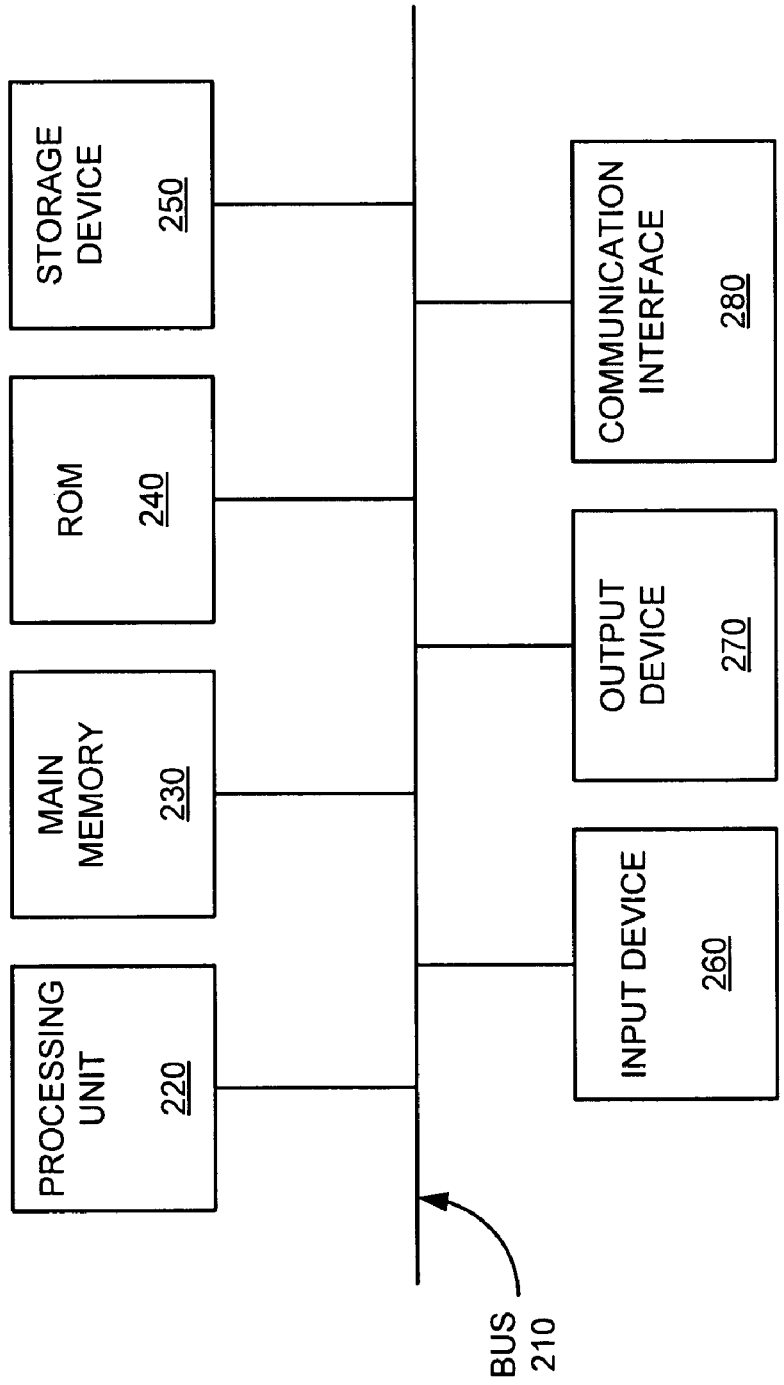
FIG. 2 illustrates a diagram of exemplary components of user devices and/or a server of the network depicted in FIG. 1.

FIG. 2 illustrates a diagram of exemplary components of a device 200 that may correspond to user devices 110 and/or server 120. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a remote control, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 130.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Figure 3:
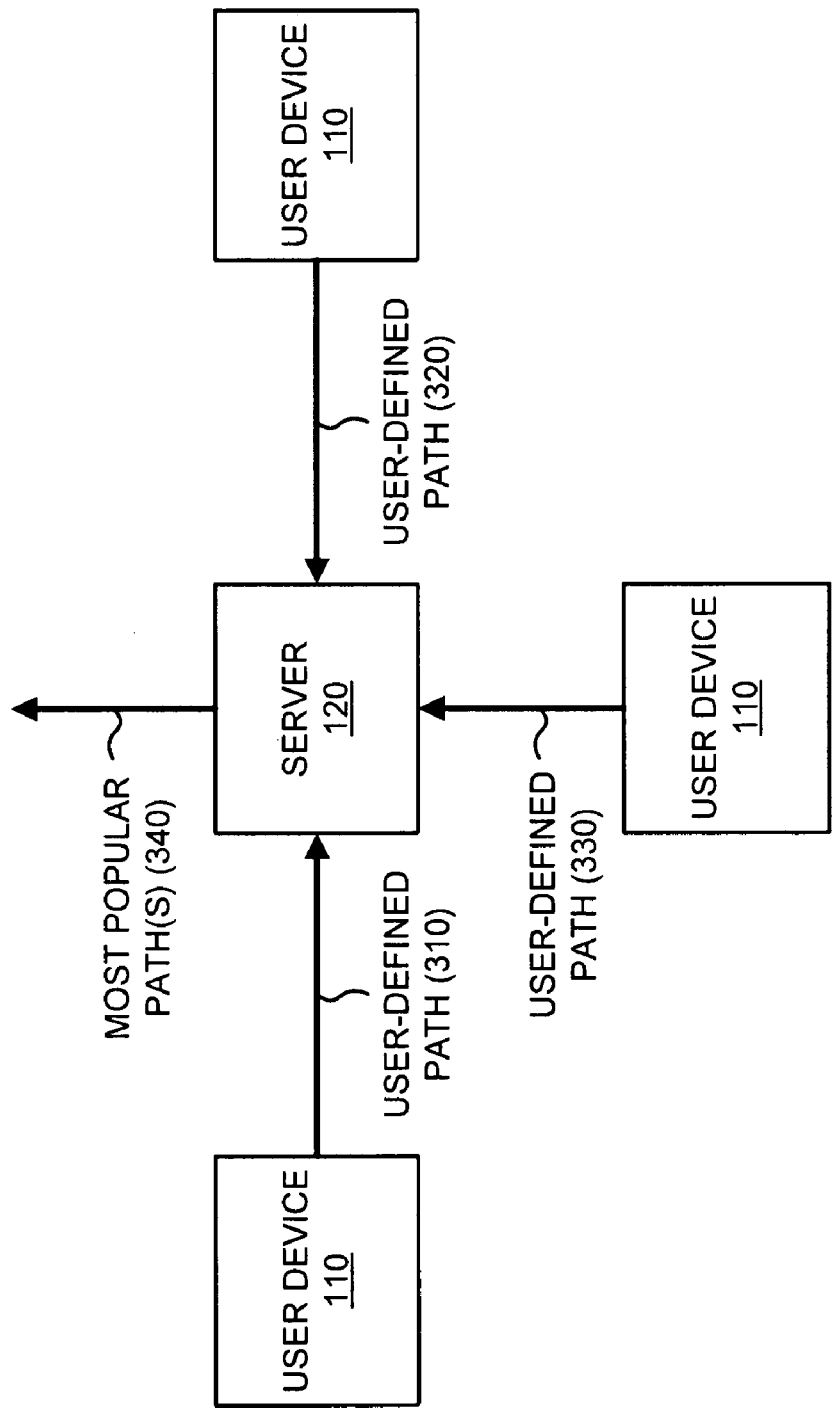
FIG. 3 depicts a diagram of exemplary operations capable of being performed by an exemplary portion of the network illustrated in FIG. 1.

FIG. 3 depicts a diagram of exemplary operations capable of being performed by an exemplary portion 300 of network 100. As illustrated, exemplary network portion 300 may include three user devices 110 and server 120. User devices 110 and server 120 may include the features described above in connection with, for example, FIG. 1.

As further shown in FIG. 3, one of user devices 110 may provide a user-defined path 310 to server 120, another one of user devices 110 may provide a user-defined path 320 to server 120, and still another one of user devices 110 may provide a user-defined path 330 to server 120. In one implementation, user devices 110 may create user-defined paths 310-330 via a GPS navigation application (e.g., software that provides navigation with route calculation and directions to the user of the route to take, based on a vector-based map; software that provides navigation tracking and shows where you have been; Nav N Go; TomTom Navigator; TomTom Mobile; DeLorme Street Atlas; ALK CoPilot Live Laptop; Destinator; Garmin nRoute; Microsoft Streets and Trips; Google Earth; Google Maps; VZ Navigator; etc.) provided by server 120 and associated with user devices 110. In other implementations, user devices 110 may create user-defined paths 310-330 via a trip planning application provided by server 120. The trip planning application may enable users (e.g., associated with user devices 110) to plan a trip (e.g., a user-defined path) between a starting point and a destination point. The trip planning application may be associated with the GPS navigation application.

In one example, user devices 110 may create user-defined paths 310-330 for a trip between Philadelphia, Pa. and New York City, N.Y. In such an example, one user-defined path 310 may include a scenic path through back roads of New Jersey that eventually leads to New York City, another user-defined path 320 may include a path that utilizes the most highways through New Jersey (e.g., the New Jersey Turnpike), and still another user-defined path 330 may include a path that traverses Pennsylvania rather than New Jersey.

Each of user-defined paths 310-330 may include path information (e.g., a user-defined starting point (e.g., Philadelphia, Pa.), a user-defined destination point (e.g., New York City, N.Y.), one or more user-defined intermediate points (e.g., waypoints, roads, locations, landmarks, points of interest, etc.) (e.g., Newark, N.J.) provided between the user-defined starting and destination points, etc.); duration information (e.g., time period to traverse user-defined paths 310-330); mileage information (e.g., a number of miles associated with each route traversed in user-defined paths 310-330, a total number of miles associated with user-defined paths 310-330); media information (e.g., images, videos, audio, etc. associated with user-defined paths 310-330, as provided by users associated with user devices 110); description information (e.g., descriptions about user-defined paths 310-330);

user comments (e.g., comments provided by the users about user-defined paths 310-330); rating information (e.g., ratings (e.g., three stars out of five stars) provided by the users about user-defined paths 310-330); traffic information (e.g., traffic conditions associated with routes traversed on user-defined paths 310-330); construction information (e.g., road construction, detour information, road closings, etc. associated with user-defined paths 310-330); etc. In one implementation, user-defined paths 310-330 may be associated with paths provided between the same starting and destination points. In other implementations, user-defined paths 310-330 may be associated with paths provided between different starting and destination points. In still other implementations, a path (e.g., user-defined paths 310-330) may be "rounded." For example, if a user starts from a particular house number on a particular street, the effective starting point (e.g., stored by server 120) may be generalized or "rounded" to the particular street, a segment of the particular street, a city containing a particular street, a half-mile radius around the starting point, etc.

Server 120 may receive user-defined paths 310-330, may aggregate user-defined paths 310-330 (e.g., that correspond to the same starting point and destination points), and may determine one or more most popular paths 340 based on the aggregated user-defined paths 310-330. For example, if user-defined paths 310-330 define the same particular path (e.g., from Philadelphia to New York City), server 120 may determine most popular path 340 (e.g., from Philadelphia to New York City) to be the particular path defined by user-defined paths 310-330. Most popular path(s) 340 may include path information, duration information, mileage information, media information, description information, user comments, rating information, traffic information, construction information, etc. as defined above in connection with user-defined paths 310-330.

In one exemplary implementation, server 120 may determine most popular paths 340 based on the rating information (e.g., most popular paths 340 may include paths with at least a four out of five star rating); based on the description information (e.g., most popular paths 340 may include paths with the most positive descriptions); based on the user comments (e.g., most popular paths 340 may include paths with the most positive user comments); based on the duration information (e.g., most popular paths 340 may include paths with the shortest durations); based on mileage information (e.g., most popular paths 340 may include paths traversing the least amount of miles), etc. In other implementations, server 120 may determine most popular paths 340 based on other information associated with user-defined paths 310-330.

Although FIG. 3 shows exemplary components of network portion 300, in other implementations, network portion 300 may contain fewer, different, differently arranged, or additional components than depicted in FIG. 3. In still other implementations, one or more components of network portion 300 may perform one or more other tasks described as being performed by one or more other components of network portion 300.

Figure 4:
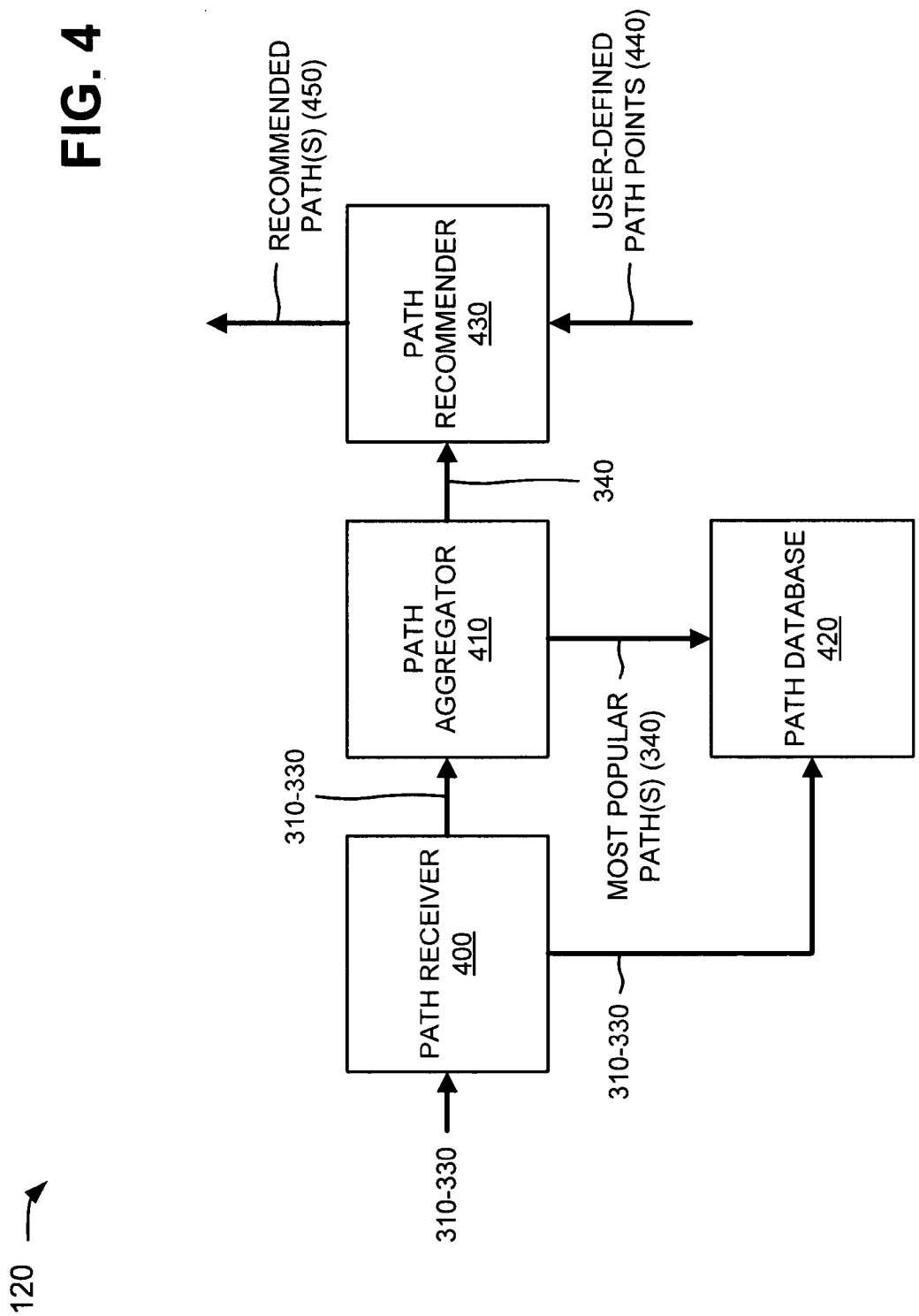
FIG. 4 illustrates a diagram of exemplary functional components of the server depicted in FIG. 1.

FIG. 4 illustrates a diagram of exemplary functional components of server 120. In one implementation, the functions described in connection with FIG. 4 may be performed by processing unit 220 (FIG. 2). As shown in FIG. 4, server 120 may include a path receiver 400, a path aggregator 410, a path database 420, and a path recommender 430.

Path receiver 400 may include any hardware or combination of hardware and software that may receive user-defined paths 310-330 from user devices 110, and may provide user-defined paths 310-330 to path aggregator 410. Path receiver 400 may also provide user-defined paths 310-330 to path database 420 for storage.

Path aggregator 410 may include any hardware or combination of hardware and software that may receive user-defined paths 310-330 from path receiver 400, and may aggregate user-defined paths 310-330. In one implementation path aggregator 410 may aggregate (or combine) user-defined paths 310-330 that correspond to the same starting point and destination points. Path aggregator 410 may utilize the aggregated user-defined paths 310-330 to determine most popular paths 340, as described above in connection with FIG. 3. In one exemplary implementation, path aggregator 410 may assign ranks to user-defined paths 310-330 (e.g., giving higher ranks to paths based on frequency of use, duration, ratings, etc.), may sort user-defined paths 310-330 based on the ranks, and may generate most popular paths 340 based on the sorted user-defined paths 310-330. Path aggregator 410 may provide most popular paths 340 to path database 420 and path recommender 430.

Path database 420 may include a storage device (e.g., main memory 230, ROM 240, storage device 250, etc.) that may store information received by server 120. In one implementation, path database 710 may store user-defined paths 310-330 received from path receiver 400, and may store most popular paths 340 received from path aggregator 410.

Path recommender 430 may include any hardware or combination of hardware and software that may receive most popular paths 340 from path aggregator 410, and may receive user-defined path points 440 (e.g., from a particular user device 110). User-defined path points 440 may include a user-defined starting point, a user-defined destination point, and/or one or more user-defined intermediate points (e.g., waypoints, roads, locations, landmarks, points of interest, etc.) provided between the user-defined starting and destination points. Path recommender 430 may determine a recommended path(s) 450 based on most popular paths 340 and user-defined path points 440 (e.g., based on a comparison of most popular paths 340 and a path defined by user-defined path points 440), and may provide one or more recommended paths 450 to the particular user device 110. Recommended path(s) 450 may include one or more of most popular paths 340 that correspond to user-defined path points 440.

Although FIG. 4 shows exemplary functional components of server 120, in other implementations, server 120 may contain fewer, different, differently arranged, or additional functional components than depicted in FIG. 4. In still other implementations, one or more functional components of server 120 may perform one or more other tasks described as being performed by one or more other functional components of server 120.

Figure 5:
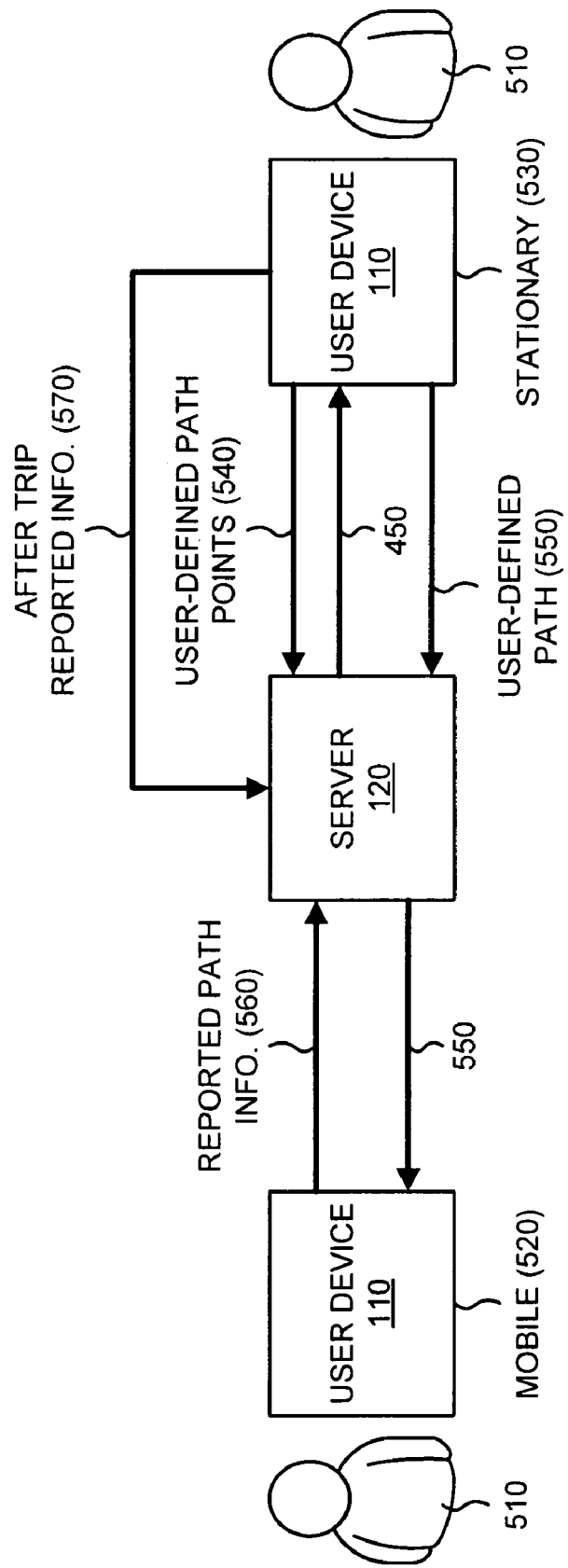
FIG. 5 depicts a diagram of exemplary operations capable of being performed by an exemplary portion of the network illustrated in FIG. 1.

FIG. 5 depicts a diagram of exemplary operations capable of being performed by an exemplary portion 500 of network 100. As illustrated, exemplary network portion 500 may include two user devices 110 and server 120. User devices 110 and server 120 may include the features described above in connection with, for example, FIG. 1. As further shown in FIG. 5, a user 510 may be associated with user devices 110. User 510 may be the same for both user devices 110 or may be different for each user device 110. For example, user 510 may be associated with a user device 110 that is mobile 520 (e.g., a cell phone, a PDA, etc.), and/or may associated with a user device 110 that is stationary 530 (e.g., a personal computer, a desktop computer, etc.).

User 510 (e.g., via stationary user device 110) may access the trip planning application provided by server 120. The trip planning application may enable user 510 to plan a trip (e.g., a user-defined path) between a starting point and a destination point. The trip planning application may be associated with the GPS navigation application (described above in connection with FIG. 3), and the GPS navigation application may be associated with mobile user device 110. User 510 (e.g., via the trip planning application) may create user-defined path points 540, and may provide user-defined path points 540 to server 120. User-defined path points 540 may include a user-defined starting point (e.g., Philadelphia, Pa.), a user-defined destination point (e.g., New York City, N.Y.), and/or one or more user-defined intermediate points (e.g., waypoints, roads, locations, landmarks, points of interest, etc.) (e.g., Newark, N.J.) provided between the user-defined starting and destination points.

Server 120 may receive user-defined path points 540 (e.g., the user-defined starting, destination, and/or intermediate points), may determine recommended path(s) 450 (FIG. 4) based on most popular paths 340 (FIG. 3) and user-defined path points 540, and may provide recommended path(s) 450 to stationary user device 110. For example, server 120 may compare the path defined by user-defined path points 540 with most popular path(s) 340, and may determine recommended path(s) 450 to be most popular path(s) 340 that match the path defined by user-defined points 540. Stationary user device 110 may receive recommended path(s) 450, and user 510 (e.g., via stationary user device 110) may select one of recommended path(s) 450 as a user-defined path 550. In other implementations, user 510 may not select one of recommended path(s) 450 as user-defined path 550, but may create user-defined path 550. Stationary user device 110 may provide user-defined path 550 to server 120, and server 120 may receive user-defined path 550. In still other implementations, user-defined path 550 may be created and/or selected via mobile user device 110.

User-defined path 550 may include a path defined by the user-defined starting point, destination point, and/or intermediate point(s) (e.g., a path that starts at Philadelphia, Pa., travels through Newark, N.J., and ends at New York City, N.Y.). Server 120 may store user-defined path 550 (e.g., in path database 420), and may retrieve information associated with user-defined path 550. Such information may include mileage information (e.g., mileage associated with each route (e.g., road, highway, etc.) traversed on user-defined path 550), directional information (e.g., maps, road names, highway names, exit information, turn information, etc.), traffic information (e.g., traffic conditions associated with routes traversed on user-defined path 550), construction information (e.g., road construction, detour information, road closings, etc.), etc. Server 120 may retrieve the associated information from a variety of sources (e.g., from services provided by the GPS navigation application, from state and federal agencies (e.g., the department of motor vehicles), etc.).

In one exemplary implementation, server 120 may provide user-defined path 550 and/or the associated information to mobile user device 110 prior to user 510 beginning to traverse user-defined path 550 (e.g., with mobile user device 110). User 510 (e.g., via mobile user device 110 and/or stationary user device 120) may review, edit, refine, update, etc. user-defined path 550 prior to traversing user-defined path 550. In other implementations, server 120 may provide (e.g., when requested by mobile user device 110) user-defined path 550 and/or the associated information to mobile user device 110 as user 510 is traversing user-defined path 550 (e.g., with mobile user device 110). In such a scenario, mobile user device 110 may provide GPS coordinates associated with mobile user device 110 (e.g., a location of mobile user device 110) to server 120, and server 120 may provide one or more portions of user-defined path 550 and/or the associated information that correspond to the GPS coordinates. For example, if user 510 is traversing a certain street associated with user-defined path 550, server 120 may provide, to mobile user device 110, portions of user-defined path 550 and/or information that correspond to the certain street.

As further shown in FIG. 5, mobile user device 110 may provide, to server 120, reported path information 560 during traversal of user-defined path 550 and/or after traversal of user-defined path 550. Reported path information 560 may include duration information (e.g., time period to traverse user-defined path 550); mileage information (e.g., a number of miles associated with each route traversed in user-defined path 550, a total number of miles associated with user-defined path 550); traffic information (e.g., traffic conditions associated with routes traversed on user-defined path 550); construction information (e.g., road construction, detour information, road closings, etc. associated with user-defined path 550); etc.

After completion of user-defined path 550, user 510 (e.g., via mobile user device 110 and/or stationary user device 120) may provide, to server 120, after trip reported information 570. After trip reported information 570 may include media information (e.g., images, videos, audio, etc. associated with user-defined path 550, as provided by user 510); description information (e.g., descriptions about user-defined path 550); user comments (e.g., comments provided by user 510 about user-defined path 550); rating information (e.g., ratings (e.g., three stars out of five stars) provided by user 510 about user-defined path 550); etc. Server 120 may receive reported path information 560 and after trip reported information 570, and may aggregate information 560/570 with other information (e.g., user-defined paths 310-330) maintained by server 120.

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

Figure 6:
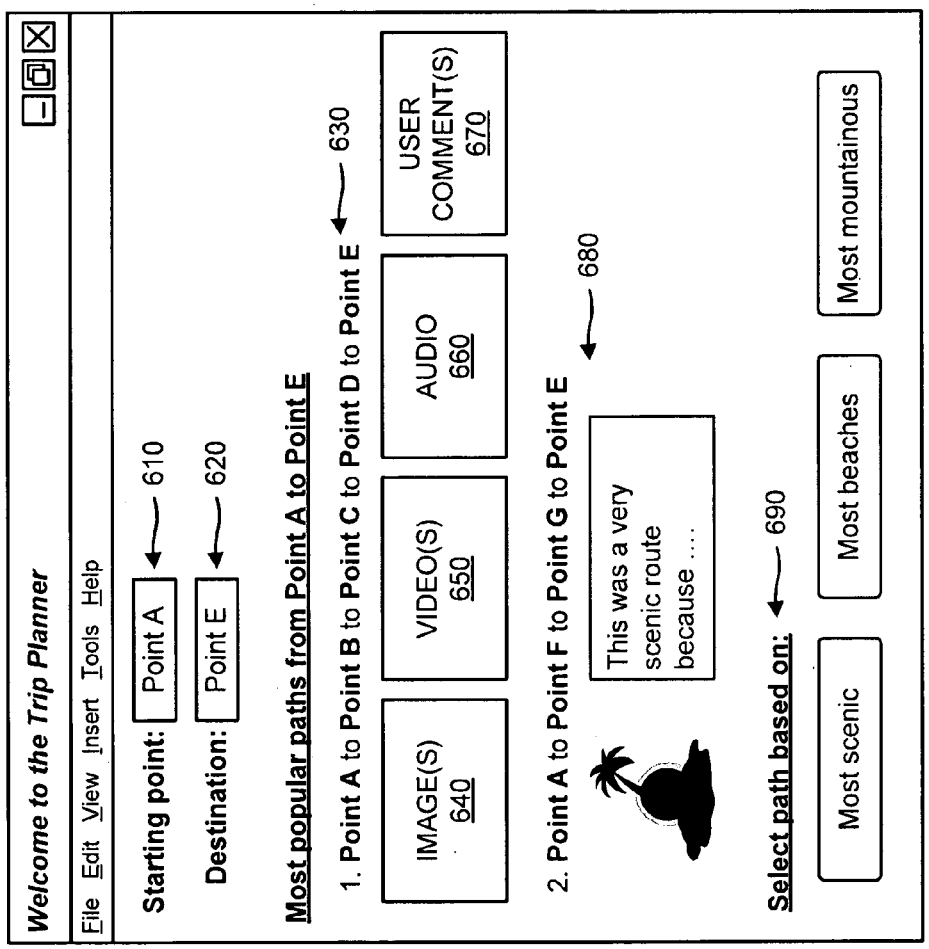
FIGS. 6 and 7 illustrate diagrams of exemplary user interfaces capable of being generated by the user devices and/or the server depicted in FIG. 1.
Figure 7:
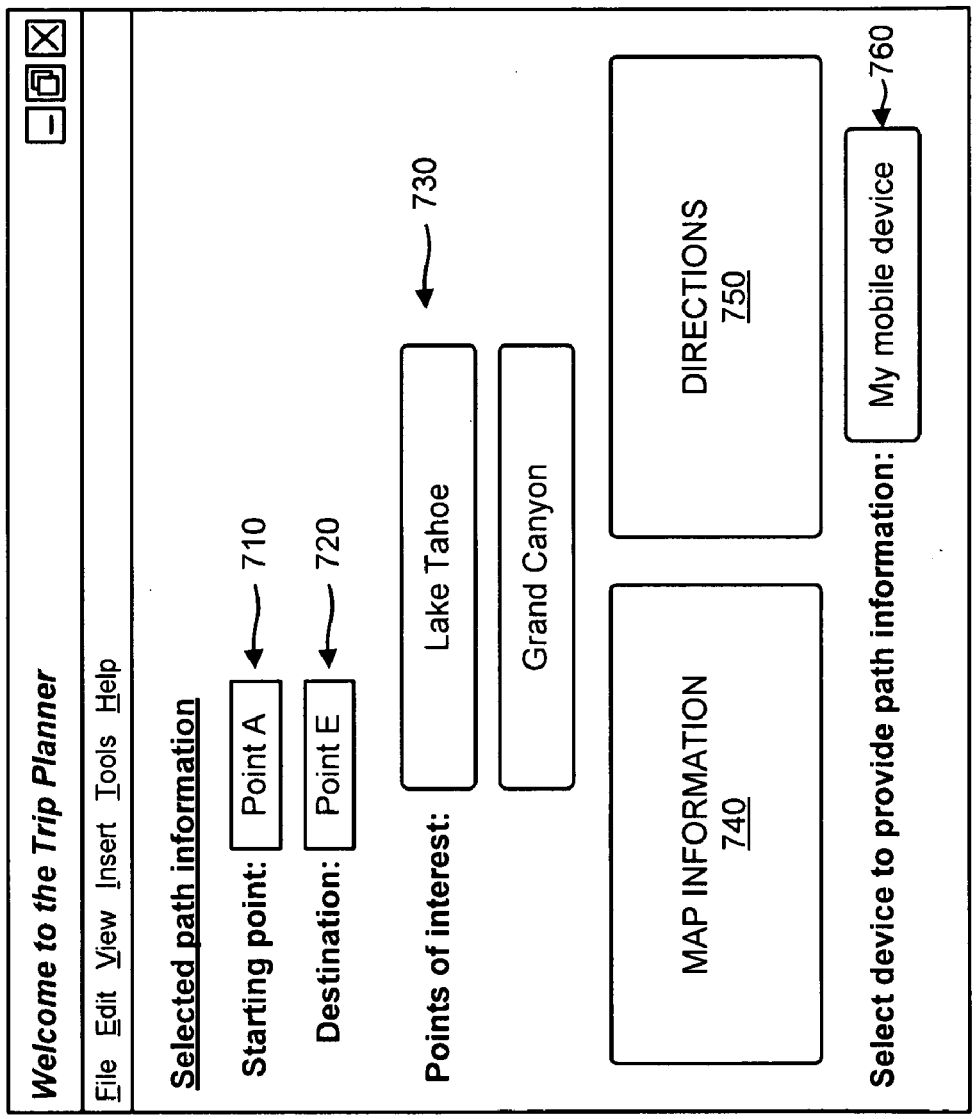

FIGS. 6 and 7 illustrate diagrams of exemplary user interfaces 600 and 700 capable of being generated by user devices 110 and/or server 120. The user interfaces depicted in FIGS. 6 and 7 (collectively referred to as "the user interfaces"), may include graphical user interfaces (GUIs) or non-graphical user interfaces, such as text-based interfaces. The user interfaces may provide information to users via customized interfaces (e.g., proprietary interfaces) and/or other types of interfaces (e.g., browser-based interfaces, television interfaces, etc.). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices. In one exemplary implementation, the user interfaces may be generated by the trip planning application (e.g., described above in connection with FIGS. 3 and 5) associated with server 120.

If a user (e.g., associated with user devices 110) accesses the trip planning application provided by server 120, the user may be presented with the user interface depicted in FIG. 6. As shown, the user may be presented with a variety of input mechanisms (e.g., fields, menus, etc.) for planning a trip (e.g., creating a user-defined path). For example, the user may be presented with a starting point input mechanism 610 and a destination input mechanism 620. Starting point input mechanism 610 may enable the user to input a starting point (e.g., "Point A") associated with the user-defined path. Destination input mechanism 620 may enable the user to input a destination point (e.g. "Point E") associated with the user-defined path.

Once the user has input the starting and destination points associated with the user-defined path, server 120 may provide corresponding most popular paths (e.g., most popular paths 340) as recommended paths (e.g., recommended paths 450) for the user-defined path. For example, as shown in FIG. 6, the user may be presented with a first recommended path 630 (e.g., a path from "Point A to Point B to Point C to Point D to Point E"). First recommended path 630 may include image(s) 640, video(s) 650, audio 660, user comment(s) 670, and/or other information (e.g., descriptions, duration information, etc.) associated with first recommended path 630. Image(s) 640 may include images (e.g., pictures of mountains, beaches, etc.) associated with first recommended path 630. Video(s) 650 may include videos (e.g., videos of landmarks, buildings, etc.) associated with first recommended path 630. Audio 660 may include sounds (e.g., crashing waves, wind, etc.) associated with first recommended path 630. User comment(s) 670 may include commentary (e.g., what to see, where to stop, where to stay, where to get gas, etc.) provided by users who traveled first recommended path 630.

As further shown in FIG. 6, the user may also be presented with a second recommended path 680 and an option 690 to select a path based on criteria. In one implementation, second recommended path 680 may be rated (or ranked) lower than first recommended path 630, as determined by server 120. Second recommended path 680 may include image information (e.g., a picture of a beach) and user comments (e.g., "This was a very scenic route because . . . "). Option 690 may enable the user to select the user-defined path based a variety of criteria (e.g., most scenic, most beaches, most mountainous, etc.).

Once the user selects the user-defined path (e.g., via user interface 600), the user may be presented with the user interface shown in FIG. 7. As shown, the user may be presented with starting point information 710, destination information 720, points of interest 730, map information 740, directions 750, and an option 760 for selecting a device for receiving the user-defined path information.

Starting point information 710 may provide a starting point (e.g., "Point A") associated with the user-defined path. Destination information 720 may provide a destination point (e.g. "Point E") associated with the user-defined path. Points of interest 730 may provide points of interest (e.g., landmarks, sites to see, natural wonders, etc., such as "Lake Tahoe" and the "Grand Canyon") associated with the user-defined path. Map information 740 may provide one or more maps associated with the user-defined path. Directions 750 may provide directional information (e.g., road names, highway names, exit information, turn information, etc.) associated with the user-defined path. Option 760 may enable the user to select a device (e.g., "My mobile device") that may receive the user-defined path and associated information. In one implementation, server 120 may provide the user-defined path and the associated information to the device selected via option 760.

Although user interfaces 600 and 700 depict a variety of information, in other implementations, user interfaces 600 and 700 may depict less, additional, different, or differently arranged information than depicted in FIGS. 6 and 7.

Figure 8A:
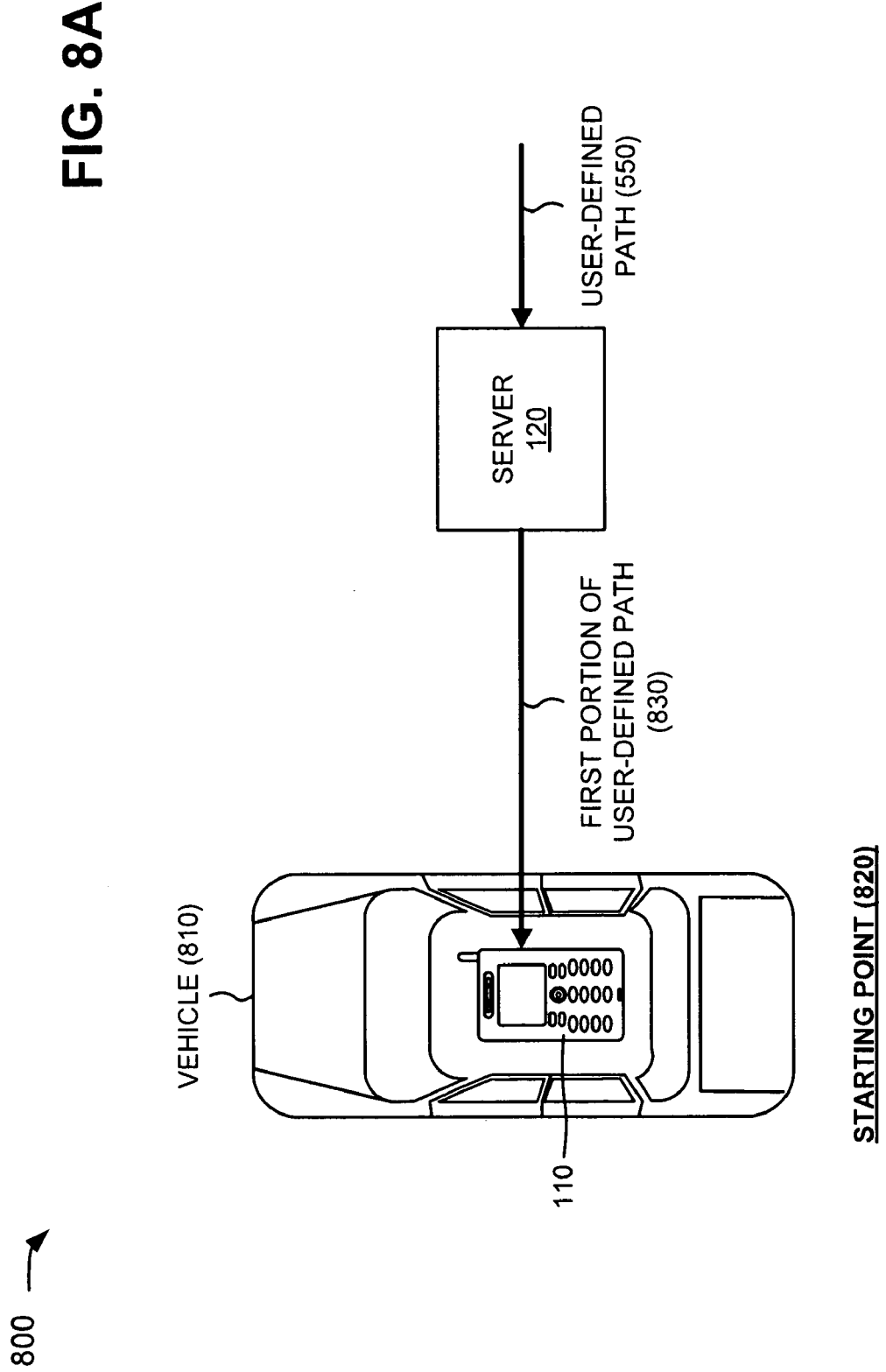
FIGS. 8A-8C illustrate diagrams of exemplary operations capable of being performed by an exemplary portion of the network illustrated in FIG. 1.
Figure 8B:
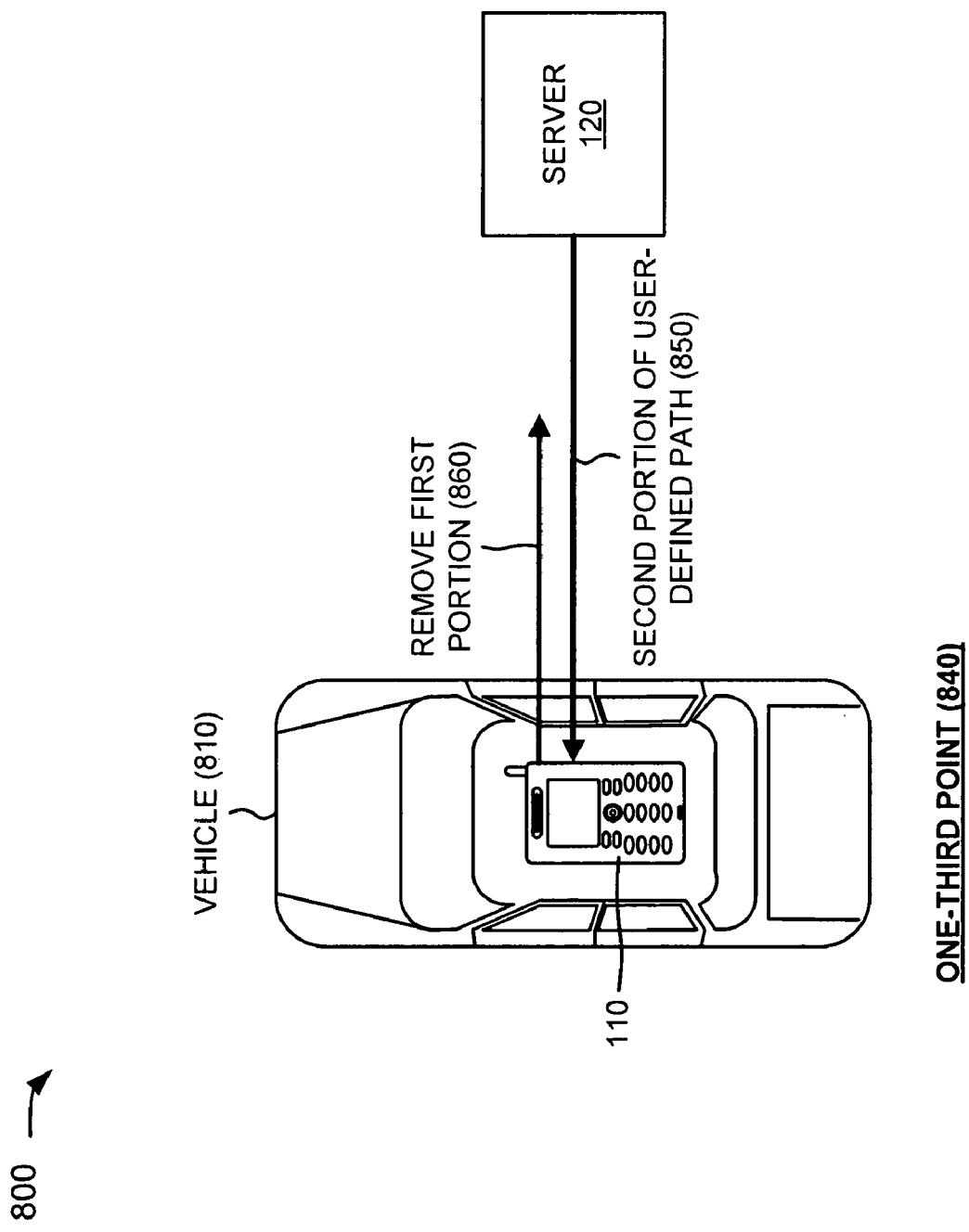
Figure 8C:
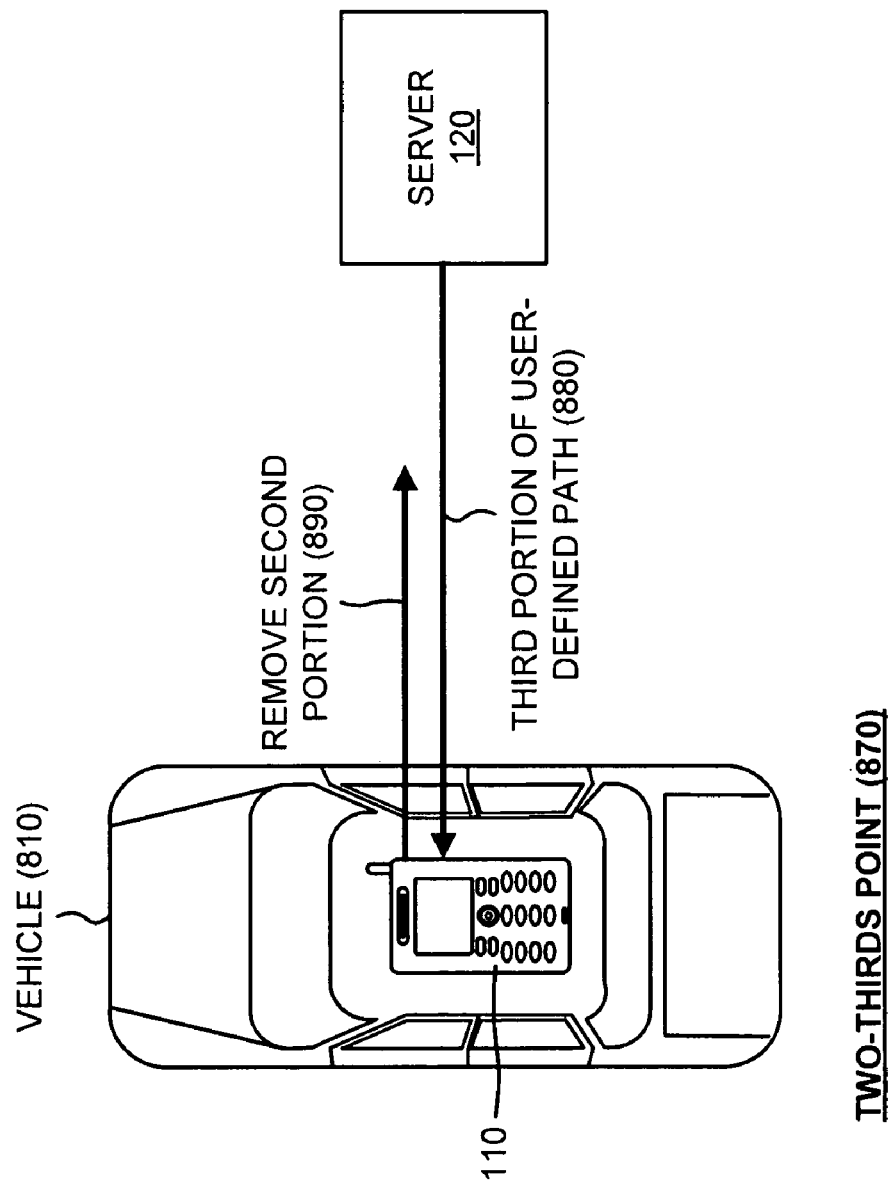

FIGS. 8A-8C illustrate diagrams of exemplary operations capable of being performed by an exemplary portion 800 of network 100. As illustrated, exemplary network portion 800 may include user device 110 and server 120. User device 110 and server 120 may include the features described above in connection with, for example, FIG. 1. As further shown in FIGS. 8A-8C, user device 110 may be associated with a vehicle 810 (e.g., a car, a truck, a van, etc.) and thus may be a mobile user device 110.

As shown in FIG. 8A, server 120 may receive a user-defined path (e.g., user-defined path 550) when vehicle 810 is located at a starting point 820 associated with user-defined path 550. A user associated with mobile user device 110 may access the GPS navigation application associated with mobile user device 110, and mobile user device 110 may provide, to server 120, GPS coordinates associated with mobile user device 110. Based on the received GPS coordinates, server 120 may determine that mobile user device 110 is at or around starting point 820 and may provide a first portion 830 of user-defined path 550 to mobile user device 110. First portion 830 of user-defined path 550 may include information (e.g., maps, mileage information, directional information, traffic information, construction information, etc.) associated with first portion 830 of user-defined path 550. Mobile user-device 110 may save first portion 830 of user-defined path 550 to memory (e.g., main memory 230, ROM 240, and/or storage device 250).

As shown in FIG. 8B, vehicle 810 (and mobile user device 110) may travel along user-defined path 550 until vehicle 810 reaches a point (e.g., a one-third point 840) associated with user-defined path 550. Based on GPS coordinates received from mobile user device 110, server 120 may determine that mobile user device 110 is at or around one-third point 840 and may provide a second portion 850 of user-defined path 550 to mobile user device 110. Second portion 850 of user-defined path 550 may include information (e.g., maps, mileage information, directional information, traffic information, construction information, etc.) associated with second portion 850 of user-defined path 550. Mobile user-device 110 may save second portion 850 of user-defined path 550 to the memory, and may remove first portion 830 of user-defined path 550 (e.g., as indicated by reference number 860) from the memory (e.g., in order to free up space for second portion 850 of user-defined path 550).

As shown in FIG. 8C, vehicle 810 (and mobile user device 110) may continue to travel along user-defined path 550 until vehicle 810 reaches another point (e.g., a two-thirds point 870) associated with user-defined path 550. Based on GPS coordinates received from mobile user device 110, server 120 may determine that mobile user device 110 is at or around two-thirds point 870 and may provide a third portion 880 of user-defined path 550 to mobile user device 110. Third portion 880 of user-defined path 550 may include information (e.g., maps, mileage information, directional information, traffic information, construction information, etc.) associated with third portion 880 of user-defined path 550. Mobile user-device 110 may save third portion 880 of user-defined path 550 to the memory, and may remove second portion 850 of user-defined path 550 (e.g., as indicated by reference number 890) from the memory (e.g., in order to free up space for third portion 880 of user-defined path 550).

Such an arrangement may enable mobile user device 110 to provide user-defined path 550 information to the user even when vehicle 810 travels in a region where connectivity with server 120 is limited or non-existent. For example, if user-defined path 550 traverses remote areas or mountainous areas (e.g., where reception of a signal from server 120, by mobile user device 110, may be blocked, limited, etc.), the portions of user-defined path 550 provided to mobile user device 110 may enable the user to navigate such areas until a signal can be received from server 120. Upon reception of a signal from server 120, mobile user device 110 may provide GPS coordinates to server 120, and server 120 may provide, to mobile user device 110 corresponding information associated with user-defined path 550.

Although FIGS. 8A-8C show exemplary components of network portion 800, in other implementations, network portion 800 may contain fewer, different, differently arranged, or additional components than depicted in FIGS. 8A-8C. In still other implementations, one or more components of network portion 800 may perform one or more other tasks described as being performed by one or more other components of network portion 800.

FIGS. 9-12 illustrate flow charts of an exemplary process 900 for enabling a user to select one or more paths preferred/chosen by other users of a navigation application according to implementations described herein. In one implementation, process 900 may be performed by server 120. In another implementation, some or all of process 900 may be performed by another device or group of devices, including or excluding server 120.

Figure 9:
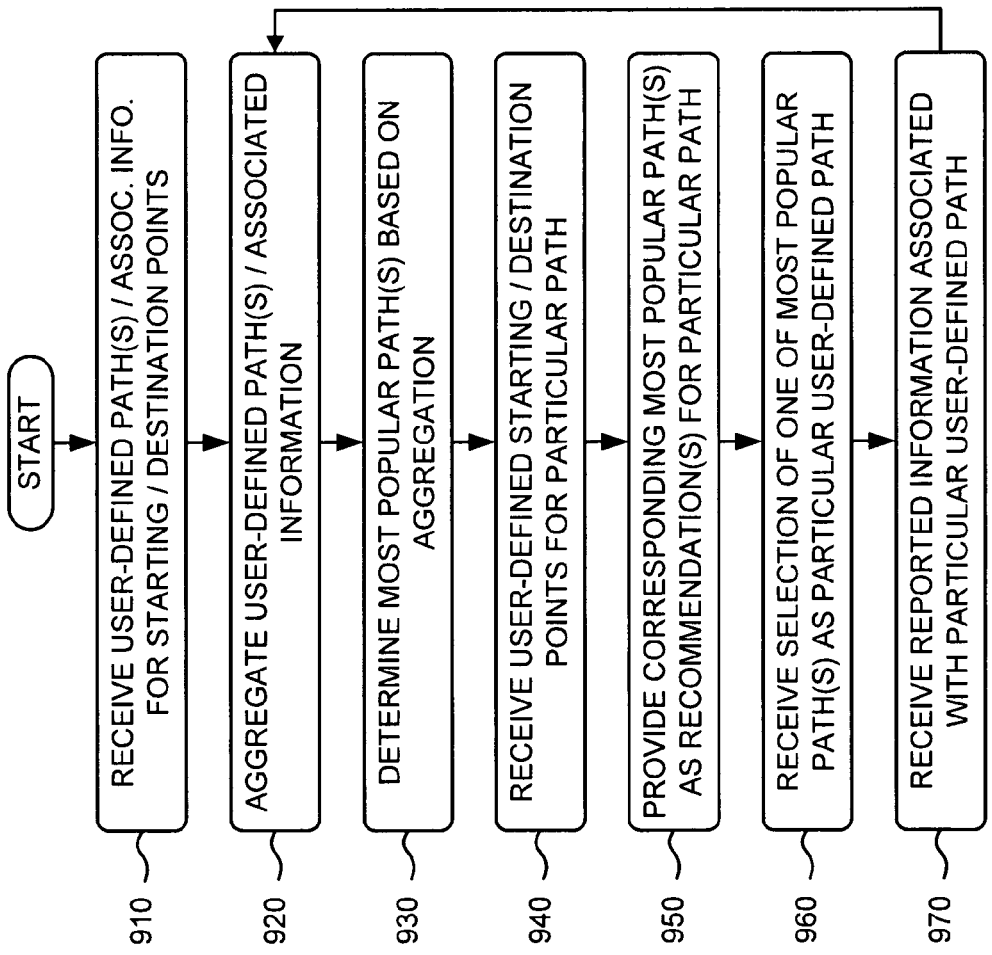

As illustrated in FIG. 9, one or more user-defined paths and associated information for particular starting and destination points may be received (block 910), the user-defined path(s) and the associated information may be aggregated (block 920), and one or more most popular paths may be determined based on the aggregation (block 930). For example, in implementations described above in connection with FIG. 3, server 120 may receive user-defined paths 310-330, may aggregate user-defined paths 310-330 (e.g., that correspond to the same starting point and destination points), and may determine one or more most popular paths 340 based on the aggregated user-defined paths 310-330. In one example, if user-defined paths 310-330 define the same particular path (e.g., from Philadelphia to New York City), server 120 may determine most popular path 340 (e.g., from Philadelphia to New York City) to be the particular path defined by user-defined paths 310-330. Most popular path(s) 340 may include path information, duration information, mileage information, media information, description information, user comments, rating information, traffic information, construction information, etc.

As further shown in FIG. 9, a user-defined starting point and destination point for a particular path be received (block 940), corresponding most popular path(s) may be provided as recommendations for the particular path (block 950), and selection of one of the most popular path(s) as a particular user-defined path may be received (block 960). For example, in implementations described above in connection with FIG. 5, server 120 may receive user-defined path points 540 (e.g., the user-defined starting, destination, and/or intermediate points), may determine recommended path(s) 450 based on most popular paths 340 and user-defined path points 540, and may provide recommended path(s) 450 to stationary user device 110. Stationary user device 110 may receive recommended path(s) 450, and user 510 (e.g., via stationary user device 110) may select one of recommended path(s) 450 as a user-defined path 550. In one example, user 510 may not select one of recommended path(s) 450 as user-defined path 550, but may create user-defined path 550. Stationary user device 110 may provide user-defined path 550 to server 120, and server 120 may receive user-defined path 550.

Returning to FIG. 9, reported information associated with the particular user-defined path may be received (block 970) and may be aggregated with the user-defined path(s) and the associated information (block 920). For example, in implementations described above in connection with FIG. 5, mobile user device 110 may provide, to server 120, reported path information 560 during traversal of user-defined path 550 and/or after traversal of user-defined path 550. Reported path information 560 may include duration information, mileage information, traffic information, construction information, etc. After completion of user-defined path 550, user 510 (e.g., via mobile user device 110 and/or stationary user device 120) may provide, to server 120, after trip reported information 570. After trip reported information 570 may include media information, description information, user comments, rating information, etc. Server 120 may receive reported path information 560 and after trip reported information 570, and may aggregate information 560/570 with other information (e.g., user-defined paths 310-330) maintained by server 120.

Figure 10:
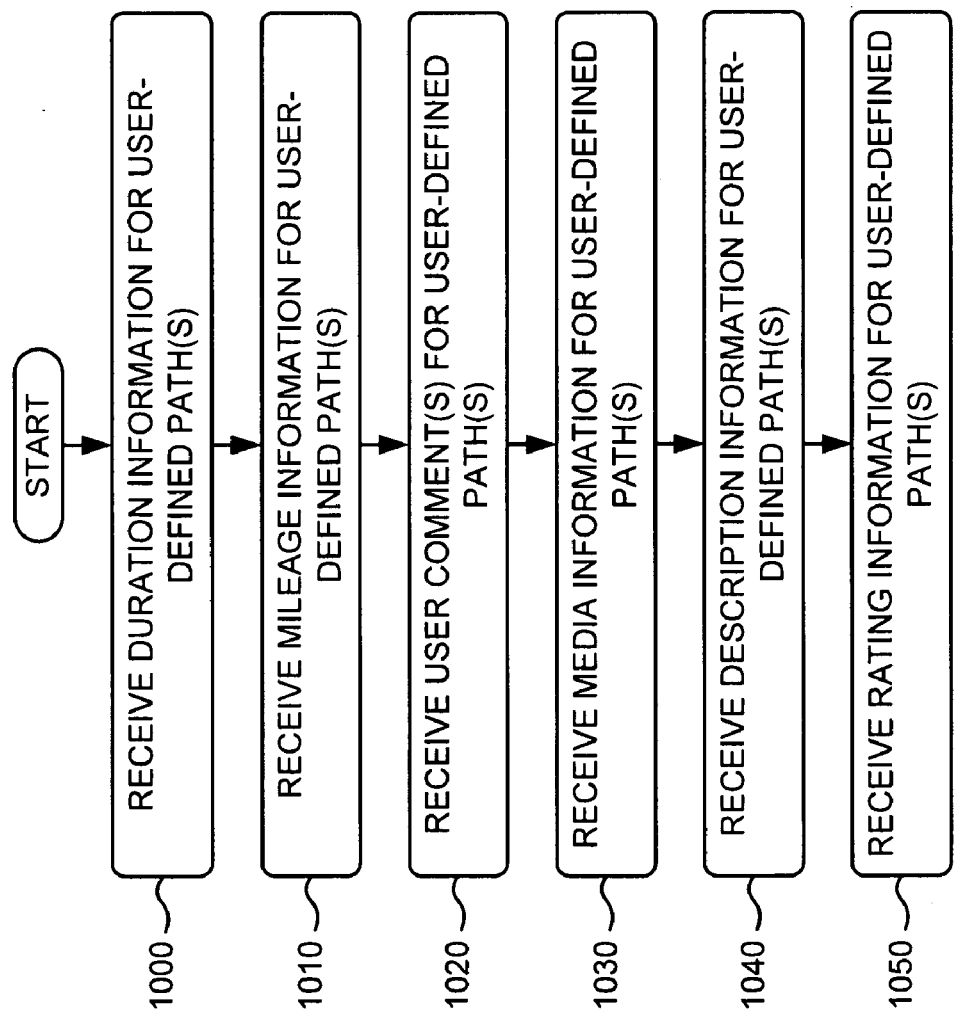

Process block 910 may include the process blocks depicted in FIG. 10. As shown in FIG. 10, process block 910 may include receiving, for the user-defined path(s), one or more of duration information (block 1000), mileage information (block 1010), one or more user comments (block 1020), media information (block 1030), description information (block 1040), and/or rating information (block 1050). For example, in implementations described above in connection with FIG. 3, server 120 may receive user-defined paths 310-330 from user devices 110. Each of user-defined paths 310-330 may include duration information (e.g., time period to traverse user-defined paths 310-330); mileage information (e.g., a number of miles associated with each route traversed in user-defined paths 310-330, a total number of miles associated with user-defined paths 310-330); media information (e.g., images, videos, audio, etc. associated with user-defined paths 310-330, as provided by users associated with user devices 110); description information (e.g., descriptions about user-defined paths 310-330); user comments (e.g., comments provided by the users about user-defined paths 310-330); rating information (e.g., ratings (e.g., three stars out of five stars) provided by the users about user-defined paths 310-330); traffic information (e.g., traffic conditions associated with routes traversed on user-defined paths 310-330); construction information (e.g., road construction, detour information, road closings, etc. associated with user-defined paths 310-330); etc.

Figure 11:
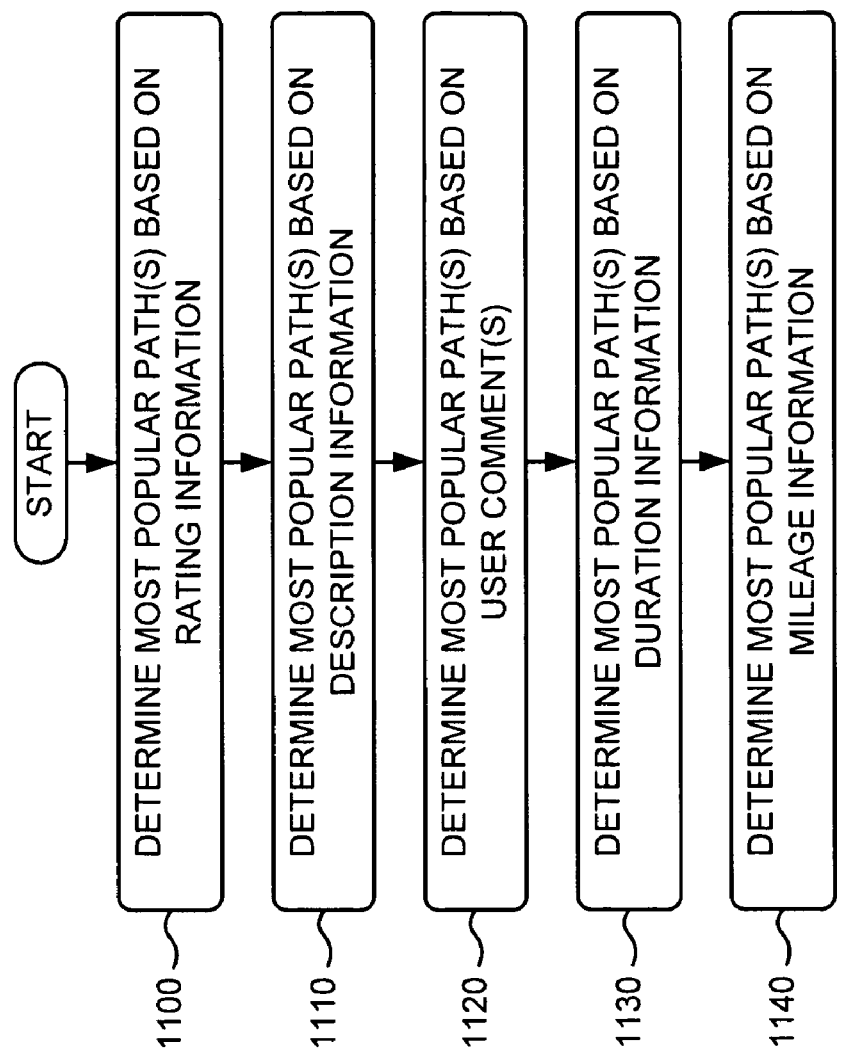

Process block 930 may include the process blocks depicted in FIG. 11. As shown in FIG. 11, process block 930 may include determining the most popular path(s) based on one or more of rating information (block 1100), description information (block 1110), one or more user comments (block 1120), duration information (block 1130), and/or mileage information (block 1140). For example, in implementations described above in connection with FIG. 3, server 120 may determine most popular paths 340 based on the rating information (e.g., most popular paths 340 may include paths with at least a four out of five star rating); based on the description information (e.g., most popular paths 340 may include paths with the most positive descriptions); based on the user comments (e.g., most popular paths 340 may include paths with the most positive user comments); based on the duration information (e.g., most popular paths 340 may include paths with the shortest durations); based on mileage information (e.g., most popular paths 340 may include paths traversing the least amount of miles), etc. In other examples, server 120 may determine most popular paths 340 based on other information associated with user-defined paths 310-330.

Figure 12:
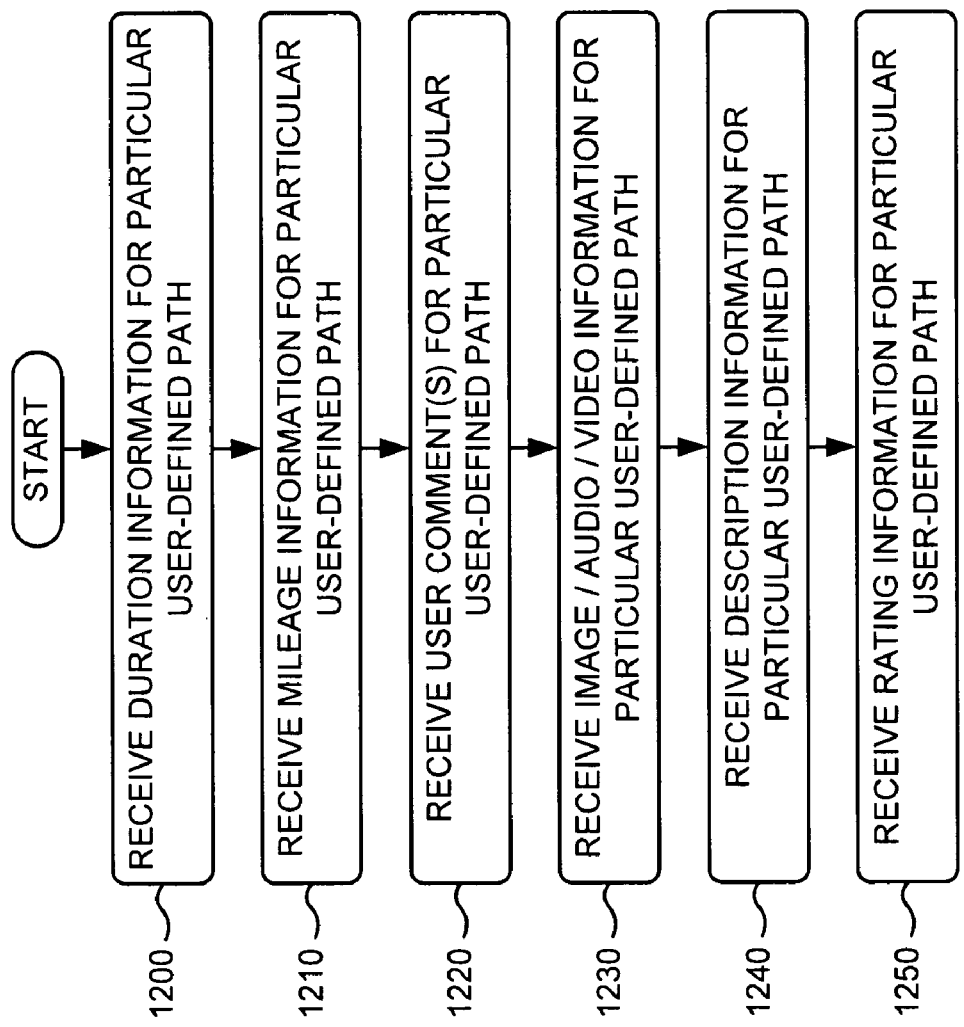

Process block 970 may include the process blocks depicted in FIG. 12. As shown in FIG. 12, process block 970 may include receiving, for the particular user-defined path, one or more of duration information (block 1200), mileage information (block 1210), one or more user comments (block 1220), image, audio, and/or video information (block 1230), description information (block 1240), and/or rating information (block 1250). For example, in implementations described above in connection with FIG. 3, mobile user device 110 may provide, to server 120, reported path information 560 during traversal of user-defined path 550 and/or after traversal of user-defined path 550. Reported path information 560 may include duration information (e.g., time period to traverse user-defined path 550), mileage information (e.g., a number of miles associated with each route traversed in user-defined path 550, a total number of miles associated with user-defined path 550), etc. After completion of user-defined path 550, user 510 (e.g., via mobile user device 110 and/or stationary user device 120) may provide, to server 120, after trip reported information 570. After trip reported information 570 may include media information (e.g., images, videos, audio, etc. associated with user-defined path 550, as provided by user 510); description information (e.g., descriptions about user-defined path 550); user comments (e.g., comments provided by user 510 about user-defined path 550); rating information (e.g., ratings (e.g., three stars out of five stars) provided by user 510 about user-defined path 550); etc.

FIG. 13 illustrates a flow chart of an exemplary process 1300 for providing portions of a user-defined path to a mobile device according to implementations described herein. In one implementation, process 1300 may be performed by server 120. In another implementation, some or all of process 1300 may be performed by another device or group of devices, including or excluding mobile server 120.

As illustrated in FIG. 13, a user-defined path to be navigated by a user associated with a mobile device may be received (block 1310), an indication of the start of path navigation may be received from the mobile device (block 1320), and a first portion of the user-defined path may be provided to the mobile device prior to navigation of the first portion of the user-defined path (block 1330). For example, in implementations described above in connection with FIG. 8A, server 120 may receive a user-defined path (e.g., user-defined path 550) when vehicle 810 is located at starting point 820 associated with user-defined path 550. A user associated with mobile user device 110 may access the GPS navigation application associated with mobile user device 110, and mobile user device 110 may provide, to server 120, GPS coordinates associated with mobile user device 110. Based on the received GPS coordinates, server 120 may determine that mobile user device 110 is at or around starting point 820 and may provide first portion 830 of user-defined path 550 to mobile user device 110.

As further shown in FIG. 14, an indication of completion of the first portion of the user-defined path and portion information may be received from the mobile device (block 1340), a second portion of the user-defined path may be provided to the mobile device prior to navigation of the second portion of the user-defined path (block 1350), and an indication of completion of the second portion of the user-defined path and portion information may be received from the mobile device (block 1360). For example, in implementations described above in connection with FIGS. 8B and 8C, vehicle 810 (and mobile user device 110) may travel along user-defined path 550 until vehicle 810 reaches a point (e.g., one-third point 840) associated with user-defined path 550. Based on GPS coordinates received from mobile user device 110, server 120 may determine that mobile user device 110 is at or around one-third point 840 and may provide second portion 850 of user-defined path 550 to mobile user device 110. Vehicle 810 (and mobile user device 110) may continue to travel along user-defined path 550 until vehicle 810 reaches another point (e.g., two-thirds point 870) associated with user-defined path 550. Based on GPS coordinates received from mobile user device 110, server 120 may determine that mobile user device 110 is at or around two-thirds point 870.

Systems and/or methods described herein may enable a user associated with a mobile communication device to select one or more paths provided by a navigation application and preferred/chosen by other users of the navigation application. The user may define one or more paths (e.g., via the navigation application), and may share the defined paths with the other users (e.g., to provide social networking for navigation).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-13, the order of the blocks may be modified in other implementations. Further, non-dependent blocks may be performed in parallel.

It will be apparent that aspects, as described herein, may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving, by the computer device and from one or more user devices, information associated with paths traversed by the one or more user devices;
   aggregating, by the computer device, the information associated with the paths;
   determining, by the computer device and based on aggregating the information associated with the paths, one or more paths, of the paths, that are most frequently traversed by the one or more user devices;
   receiving, by the computer device and from a user device, a starting point and a destination point;

determining, by the computer device, a particular path, of the one or more paths, based on the starting point and the destination point;

providing, by the computer device and to the user device, information associated with the particular path;

receiving, by the computer device and from the user device, reported information associated with traversing the particular path by the user device, the receiving of the reported information including:
    receiving a portion of the reported information after traversal of the particular path by the user device; and
    aggregating, by the computer device, the information associated with the paths and the reported information associated with traversing the particular path.

2. The computing device-implemented method of claim 1, where receiving the reported information includes:
    receiving a portion of the reported information during traversal of the particular path by the user device.

3. The computing device-implemented method of claim 1, where receiving the reported information comprises:
    receiving, from the user device, one or more of:
        duration information associated with a time period for traversing the particular path by the user device,
        mileage information associated with the particular path,
        one or more user comments associated with the particular path,
        media information associated with the particular path,
        description information associated with the particular path, or
        rating information associated with the particular path.

4. The computing device-implemented method of claim 1, where receiving the information associated with the paths comprises:
    receiving one or more of:
        duration information associated with traversing the paths,
        mileage information associated with the paths,
        one or more user comments associated with the paths,
        media information associated with the paths,
        description information associated with the paths, or
        rating information associated with the paths.

5. The computing device-implemented method of claim 4, where determining the particular path comprises:
    determining the particular path further based on the received at least one of:
    the duration information,
    the mileage information,
    the one or more user comments,
    the media information,
    the description information, or
    the rating information.

6. The computing device-implemented method of claim 4, where:
    the duration information includes time periods for traversing the paths,
    the mileage information includes mileage associated with the paths,
    the one or more user comments include comments provided by users associated with the one or more user devices traversing the paths,
    the media information includes one or more of images, videos, or audio associated with the paths and provided by the users associated with the one or more user devices,
    the description information includes descriptions about the paths, and
    the rating information includes ratings provided by the users associated with the one or more user devices.

7. The computing device-implemented method of claim 1, where each of the one or more user devices comprises one or more of:
    a radiotelephone,
    a personal communications system (PCS) terminal,
    a personal digital assistant (PDA),
    a personal computer,
    a laptop computer,
    global positioning system (GPS) navigation device, or
    an in-vehicle GPS navigation system.

8. The computing device-implemented method of claim 1, further comprising:
    receiving, from the user device, one or more intermediate points, and
    determining the particular path further based on the one or more intermediate points.

9. A device, comprising:
    a memory to store a plurality of instructions; and
    a processor to execute one or more of the plurality of instructions in the memory to:
        receive, from one or more user devices, information associated with paths traversed by the one or more user devices,
        aggregate the information associated with the paths,
        determine, based on the aggregation of the information associated with the paths, one or more paths, of the paths, that are most frequently traversed by the one or more user devices,
        receive, from a particular user device, a starting point and a destination point,
        determine a particular path, of the one or more paths, based on the starting point and the destination point,
        provide, to the particular user device, information associated with traversing the particular path,
        receive, from the particular user device, reported information associated with traversing the particular path,
        the processor, when receiving the reported information, further executing one or more of the plurality of instructions in the memory to:
            receive a portion of the reported information during traversal of the particular path by a user associated with the particular user device,
            receive another portion of the reported information after the traversal of the particular path by the user associated with the particular user device, and
        aggregate the information associated with the paths and the reported information associated with traversing the particular path.

10. The device of claim 9, where, when receiving, from the particular user device, the reported information, the processor further executes instructions in the memory to:
    receive one or more of:
        duration information associated with the particular path,
        mileage information associated with the particular path,
        one or more user comments associated with the particular path,
        media information associated with the particular path,
        description information associated with the particular path, or
        rating information associated with the particular path.

11. The device of claim 9, where, when receiving, from the one or more user devices, the information associated with the paths, the processor further executes instructions in the memory to:
    receive one or more of:

duration information associated with the paths,
mileage information associated with the paths,
one or more user comments associated with the paths,
media information associated with the paths,
description information associated with the paths, or
rating information associated with the paths.

12. The device of claim 11, where, when determining the particular path, the processor further executes instructions in the memory to:
determine the particular path based on the received one or more of:
the duration information,
the mileage information,
the one or more user comments associated with the particular path,
the media information,
the description information, or
the rating information.

13. The device of claim 11, where:
the duration information includes time periods for traversing the paths,
the mileage information includes mileage associated with the paths,
the one or more user comments include comments associated with the paths and provided by users associated with the one or more user devices,
the media information includes one or more of images, videos, or audio associated with the paths and provided by the users associated with the one or more user devices,
the description information includes descriptions about the paths, and
the rating information includes ratings provided by the users associated with the one or more user devices.

14. The device of claim 9, where the processor, when determining the particular path, further executes instructions in the memory to:
receive, from the particular user device, one or more intermediate points, and
determine the particular path further based on the one or more intermediate points.

15. A non-transitory computer-readable medium to store instructions comprising:
one or more instructions which, when executed by a processor, cause the processor to receive, from one or more user devices, information associated with paths traversed by the one or more user devices;
one or more instructions which, when executed by the processor, cause the processor to aggregate the information associated the paths;
one or more instructions which, when executed by the processor, cause the processor to determine, based on the aggregation of the information associated with the paths, one or more paths, of the paths, that are most frequently traversed by the one or more user devices;
one or more instructions which, when executed by the processor, cause the processor to receive, from a particular user device, a starting point and a destination point;
one or more instructions which, when executed by the processor, cause the processor to determine a particular path, of the one or more paths, based on the starting point and the destination point;
one or more instructions which, when executed by the processor, cause the processor to provide, to the particular user device, information associated with the particular path;
one or more instructions which, when executed by the processor, cause the processor to receive, from the particular user device, reported information associated with the particular path, the one or more instructions to receive the reported information including:
one or more instructions to receive a portion of the reported information during traversal of the particular path by a user associated with the particular user device, and
one or more instructions receive another portion of the reported information after traversal of the particular path by the user associated with the particular user device; and
one or more instructions which, when executed by the processor, cause the processor to aggregate the information associated with the paths and the reported information associated with the particular path.

16. The non-transitory computer-readable medium of claim 15, where the one or more instructions to receive the information associated with traversing the paths further include:
one or more instructions to receive one or more of:
duration information associated with traversing the paths,
mileage information associated with traversing the paths,
one or more user comments associated with traversing the paths,
media information associated with traversing the paths,
description information associated with traversing the paths, or
rating information associated with traversing the paths; and
where the one or more instructions to determine the particular path further include:
one or more instructions to determine the particular path based on the received one or more of:
the duration information,
the mileage information,
the one or more user comments,
the media information,
the description information, or
the rating information.

\* \* \* \* \*